United States Patent
Yoon et al.

(10) Patent No.: US 8,867,551 B2
(45) Date of Patent: *Oct. 21, 2014

(54) METHOD FOR SUPPORTING COEXISTENCE CONSIDERING WHILE SUBCHANNEL ALLOCATION IN A BROADBAND WIRELESS ACCESS SYSTEM

(75) Inventors: Won Yong Yoon, Anyang-si (KR); Hyo Sik Lee, Anyang-si (KR); Sung June Youn, Anyang-si (KR); Ki Seon Ryu, Anyang-si (KR); Soo Jin Chae, Anyang-si (KR)

(73) Assignee: LG Electronics Inc., Seoul (KR)

( * ) Notice: Subject to any disclaimer, the term of this patent is extended or adjusted under 35 U.S.C. 154(b) by 139 days.

This patent is subject to a terminal disclaimer.

(21) Appl. No.: 13/345,609

(22) Filed: Jan. 6, 2012

(65) Prior Publication Data

US 2012/0106421 A1 May 3, 2012

Related U.S. Application Data

(63) Continuation of application No. 12/392,455, filed on Feb. 25, 2009, now Pat. No. 8,116,319.

(60) Provisional application No. 61/033,797, filed on Mar. 5, 2008, provisional application No. 61/031,015, filed on Feb. 25, 2008.

(30) Foreign Application Priority Data

Jun. 25, 2008 (KR) .................. 10-2008-0060333

(51) Int. Cl.
*H04L 12/28* (2006.01)
*H04W 52/02* (2009.01)
*H04W 72/04* (2009.01)
*H04W 88/06* (2009.01)

(52) U.S. Cl.
CPC .......... *H04W 72/0413* (2013.01); *H04W 88/06* (2013.01); *H04W 52/0212* (2013.01)
USPC ........................................ 370/395.5; 370/324

(58) Field of Classification Search
USPC .......................................... 370/329, 280, 311
See application file for complete search history.

(56) References Cited

U.S. PATENT DOCUMENTS

| | | | |
|---|---|---|---|
| 5,966,378 A | 10/1999 | Hamalainen | |
| 7,764,658 B2 | 7/2010 | Garrett et al. | |

(Continued)

FOREIGN PATENT DOCUMENTS

| | | |
|---|---|---|
| JP | 2005080312 | 3/2005 |
| JP | 2007043660 | 2/2007 |

(Continued)

OTHER PUBLICATIONS

"MAC Support for co-located coexistence with Wireless LAN and Wireless PAN", Floyd Simpson et al., Jan. 1, 2008, retrieved from www.ieee802.org/16/maint/contrib/C80216maint-08_008.doc, retrieved on Oct. 11, 2013.*

(Continued)

*Primary Examiner* — Andrew Lai
*Assistant Examiner* — Jamaal Henson
(74) *Attorney, Agent, or Firm* — Lee, Hong, Degerman, Kang & Waimey

(57) ABSTRACT

A method for supporting coexistence in a mobile station configured for supporting a coexistence mode of a primary wireless communication system and a secondary wireless communication system. The method comprises transmitting to a base station, via the mobile station, a registration request (REG-REQ) message comprising coexistence capability information, receiving a registration response (REG-RSP) message comprising information about support of the coexistence mode in response to the REG-REQ message, and transmitting to the base station, via the mobile station, a sleep mode request (MOB_SLP-REQ) message comprising first coexistence information for requesting a band adaptive modulation and coding (AMC) for adjacent subcarrier permutation.

10 Claims, 5 Drawing Sheets

(56) References Cited

U.S. PATENT DOCUMENTS

| | | |
|---|---|---|
| 7,796,698 B2 | 9/2010 | Koorapaty et al. |
| 7,826,459 B2 | 11/2010 | Xhafa et al. |
| 7,907,572 B2 | 3/2011 | Yang et al. |
| 7,929,432 B2 | 4/2011 | Zhu et al. |
| 8,116,319 B2 | 2/2012 | Yoon et al. |
| 2002/0080749 A1 | 6/2002 | Terry |
| 2004/0100939 A1 | 5/2004 | Kriedte et al. |
| 2005/0147112 A1 | 7/2005 | Sugaya |
| 2005/0174953 A1 | 8/2005 | Ho |
| 2005/0201309 A1 | 9/2005 | Kang et al. |
| 2005/0233709 A1 | 10/2005 | Gardner et al. |
| 2005/0271006 A1 | 12/2005 | Chari et al. |
| 2005/0276241 A1 | 12/2005 | Kamerman et al. |
| 2005/0276250 A1 | 12/2005 | Grieco et al. |
| 2006/0029031 A1 | 2/2006 | Koorapaty |
| 2006/0084383 A1 | 4/2006 | Ibrahim et al. |
| 2006/0148411 A1 | 7/2006 | Cho et al. |
| 2007/0153734 A1 | 7/2007 | Lee et al. |
| 2007/0165589 A1 | 7/2007 | Sakoda |
| 2007/0224936 A1 | 9/2007 | Desai |
| 2007/0232358 A1 | 10/2007 | Sherman |
| 2007/0274273 A1 | 11/2007 | Grushkevich et al. |
| 2008/0025251 A1 | 1/2008 | Lee et al. |
| 2008/0056133 A1 | 3/2008 | Deshpande et al. |
| 2008/0107047 A1* | 5/2008 | Olfat ........................ 370/280 |
| 2008/0137599 A1 | 6/2008 | Ham et al. |
| 2008/0159185 A1 | 7/2008 | Howard |
| 2008/0238807 A1 | 10/2008 | Ibrahim et al. |
| 2009/0040990 A1 | 2/2009 | Xhafa et al. |
| 2009/0054009 A1 | 2/2009 | Yang et al. |
| 2009/0067374 A1* | 3/2009 | Yoon et al. ................. 370/329 |
| 2009/0080401 A1 | 3/2009 | Zhu et al. |
| 2009/0137206 A1 | 5/2009 | Sherman et al. |
| 2009/0213773 A1 | 8/2009 | Yoon et al. |
| 2011/0002291 A1 | 1/2011 | Gonikberg et al. |
| 2011/0194506 A1 | 8/2011 | Hirsch et al. |
| 2012/0034870 A9 | 2/2012 | Desai et al. |

FOREIGN PATENT DOCUMENTS

| | | |
|---|---|---|
| JP | 2007068070 | 3/2007 |
| KR | 1019990025877 | 4/1999 |
| KR | 10-2004-0064823 | 7/2004 |
| KR | 10-2005-0071339 | 7/2005 |
| KR | 10-2008-0012925 | 2/2008 |
| WO | 2006/022530 | 3/2006 |
| WO | 2007/000691 | 1/2007 |
| WO | 2007031960 | 3/2007 |
| WO | 2007/070409 | 6/2007 |
| WO | 2007/078118 | 7/2007 |
| WO | 2007/091235 | 8/2007 |
| WO | 2007/091858 | 8/2007 |

OTHER PUBLICATIONS

"MAC Support for co-located coexistence with Wireless LAN and Wireless PAN", Floyd Simpson et al., Jan. 1, 2008, retrieved from www.ieee802.org/16/maint/contrib/C80216maint-08_008.doc, retrieved on Oct. 11, 2013.*

Anis Koubaa et al., "A Time Division Beacon Scheduling Mechanism for IEEE 802.15.4/Zigbee Cluster-Tree Wireless Sensor Networks", 19th Euromicro Conference on Real-Time Systems (ECRTS'07), 2007.

Intellectual Property Corporation of Malaysia Application No. PI2010004003, Search Report dated Dec. 31, 2013, 3 pages.

\* cited by examiner

METHOD FOR SUPPORTING COEXISTENCE CONSIDERING WHILE SUBCHANNEL ALLOCATION IN A BROADBAND WIRELESS ACCESS SYSTEM

This application is a continuation of U.S. patent application Ser. No. 12/392,455, filed on Feb. 25, 2009, now U.S. Pat. No. 8,116,319, which claims the benefit of earlier filing date and right of priority to Korean Application No. 10-2008-0060333, filed on Jun. 25, 2008, and also claims the benefit of U.S. Provisional Application Ser. Nos. 61/033,797, filed Mar. 5, 2008 and 61/031,015, filed on Feb. 25, 2008, the contents of which are all hereby incorporated by reference herein in their entirety.

BACKGROUND OF THE INVENTION

1. Field of the Invention

The present invention relates to the support of multi-radio coexistence in a mobile station using a broadband wireless access system, and more particularly, to a method for improving throughput of a broadband wireless access system and another wireless communication system.

2. Discussion of the Related Art

In a broadband wireless access system based on the IEEE 802.16e system, a sleep mode for minimizing power consumption of a mobile station is supported. The mobile station requests a base station to transition to a sleep mode via a sleep mode request (MOB_SLP-REQ) message if downlink traffic is not present during a predetermined time. Accordingly, the base station allows the sleep mode entry of the mobile station via a sleep mode response (MOB_SLP-RSP) message.

In the sleep mode, the operation of the mobile station is performed by the repetition of a sleep interval and a listening interval. In the listening interval, the IEEE 802.16e system is used, and, in the sleep interval, the use of other wireless communication such as Bluetooth or WiFi is allowed to provide coexistence of a time sharing scheme.

However, the total throughput of the time sharing scheme cannot exceed 1, and throughput deterioration may occur due to the interruption of a transmission or reception operation which has been performed, that is, fragmentation, in a time boundary.

SUMMARY OF THE INVENTION

Accordingly, the present invention is directed to a method for supporting coexistence while considering subchannel allocation in a broadband wireless access system that substantially obviates one or more problems due to limitations and disadvantages of the related art.

An object of the present invention is to provide a method for supporting coexistence while considering subchannel allocation in a broadband wireless access system, which is capable of simultaneously using a wireless wide area network (WWAN) communication and a wireless personal area network/wireless local area network (WPAN/WLAN) communication and, as a result, improving coexistence throughput.

Another object of the present invention is to provide a method for supporting coexistence while considering subchannel allocation in a broadband wireless access system, which is capable of supporting wireless communications which coexist by a method such as adjacent subcarrier permutation with respect to a mobile station, to which a method for supporting coexistence while considering subchannel allocation is applied.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for supporting coexistence while considering subchannel allocation includes requesting a band adaptive modulation and coding (AMC) for adjacent subcarrier permutation to a base station by transmitting first coexistence information, after the secondary wireless communication is turned on, and requesting a release of the adjacent subcarrier permutation to the base station by transmitting second coexistence information, if the secondary wireless communication system is turned off.

The adjacent subcarrier permutation may allocate subcarriers of any one of an uppermost frequency band or a lowermost frequency band to the mobile station according to a bit value of the first coexistence information.

The first coexistence information indicating the band AMC allocation may be transmitted to the base station via a sleep mode request (MOB_SLP-REQ) message.

The requesting the release of the adjacent subcarrier permutation may includes, at the mobile station, transmitting a sleep mode request (MOB_SLP-REQ) message including third coexistence information for requesting partial usage subchannel (PUSC) allocation to the mobile station to the base station.

The requesting the band AMC may includes, at the mobile station, transmitting a report response (REP-RSP) message for requesting band AMC allocation to the mobile station to the base station.

The requesting the release of the adjacent subcarrier permutation may includes, at the mobile station, transmitting a report response (REP-RSP) message indicating partial usage subchannel (PUSC) allocation to the mobile station to the base station.

The requesting the band AMC may be performed in a WiMAX active period.

In another aspect of the present invention, a method for supporting coexistence while considering subchannel allocation includes, at the mobile station, transmitting a registration request (REG-REQ) message including coexistence capability information to a base station; receiving a registration response (REG-RSP) message comprising information about the support of the coexistence mode in response to the registration request (REG-REQ) message; turning on the second wireless communication system; requesting a band adaptive modulation and coding (AMC) for adjacent subcarrier permutation to a base station by transmitting first coexistence information; and requesting a release of the adjacent subcarrier permutation to the base station by transmitting second coexistence information, if the secondary wireless communication system is turned off. The secondary wireless communication may be Bluetooth wireless communication.

In another aspect of the present invention, a method for supporting coexistence operation while considering subchannel allocation includes, when coexistence information for requesting a band adaptive modulation and coding (AMC) is received from the mobile station, allocating a subchannel of an adjacent channel band to the mobile station; and, when coexistence information for requesting the release of adjacent subcarrier permutation is received from the mobile station, allocating a partial usage subchannel (PUSC) to the mobile station.

The allocating of the band AMC to the mobile station may include allocating subcarriers of any one of an uppermost frequency band or a lowermost frequency band to the mobile station according to a bit value of the coexistence information.

The coexistence information may be received via a sleep mode request (MOB_SLP-REQ) message.

The coexistence information may be received via a report response (REP-RSP) message.

Although IEEE 802.16e, that is, WiMAX, is described as an example of a broadband wireless access system in the embodiments of the present invention, a method for supporting coexistence while considering subchannel allocation according to the embodiments of the present invention is applicable every broadband wireless access system.

According to the embodiments of the present invention, it is possible to provide simultaneity of different wireless communications when a sleep mode is used and improve simultaneity of different wireless communications even when the sleep mode is not used.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
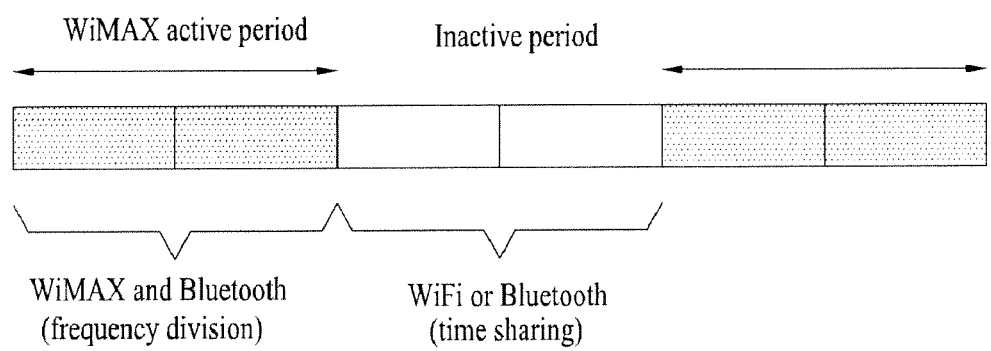
FIG. 1 is a view showing an example of a coexistence method of WiMAX and Bluetooth.

Reference will now be made in detail to the preferred embodiments of the present invention, examples of which are illustrated in the accompanying drawings. However, the embodiments of the present invention may be variously modified and the range of the present invention is not limited to the following embodiments.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The specific terms used in the following description are provided for facilitating the understanding of the present invention, and the use of the specific terms may be variously changed without departing from the technical scope of the present invention.

The above-mentioned embodiments of the present invention are disclosed on the basis of a data communication relationship between a base station and a mobile station. In this case, the base station is used as a terminal node of a network via which the base station can directly communicate with the mobile station. Specific operations to be conducted by the base station in the present invention may also be conducted by an upper node of the base station as necessary.

In other words, it will be obvious to those skilled in the art that various operations for enabling the base station to communicate with the mobile station in a network composed of several network nodes including the base station will be conducted by the base station or other network nodes other than the base station. The term "Base Station" may be replaced with a fixed station, Node-B, eNode-B (eNB), or an access point as necessary. The term "mobile station" may also be replaced with an user equipment (UE), a mobile station (MS) or a mobile subscriber station (MSS) as necessary.

The following embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

FIG. 1 is a view showing an example of a coexistence method of WiMAX and Bluetooth.

WiMAX frames may be grouped into an active period and an inactive period. The inactive period may be a sleep period of a sleep mode defined in the IEEE 802.16e standard or a scanning period.

In the embodiments of the present invention, there is no limitation in a detailed method for implementing the inactive period. Generally, a period which is an inactive state for turning off WiMAX wireless communication is called an inactive period. The length of the inactive period may be 0. In the inactive period, other coexisting wireless communication such as WiFi, Bluetooth or the like may be used instead of WiMAX.

The WiFi, Bluetooth or the like may coexist with primary wireless communication such as WiMAX or the like in the inactive period by a time sharing scheme. In the active period, the primary wireless communication may be turned on to transmit or receive data.

Unlike the prior art, in order to simultaneously use the primary wireless communication and secondary wireless communication such as Bluetooth in the inactive period, in the embodiments of the present invention, a method for performing the primary wireless communication such as WiMAX using a subcarrier having low interference with the second communication such as Bluetooth is provided.

An adaptive modulation & coding (AMC) scheme refers to a data transmission scheme for setting different modulation schemes and coding schemes of data channels according to a channel status of a cell, that is, a channel status between a base station and a mobile station, so as to improve use efficiency of the whole cell. Such an AMC scheme has a plurality of modulation schemes and a plurality of coding schemes and modulates and codes data channel signals by combining the modulation schemes and the coding schemes. Generally, each of combinations of the modulation schemes and the coding schemes is called a modulation and coding scheme (MCS), and a plurality of MCSs may be defined from a level 1 to a level N according to the number of MCSs. That is, the AMC scheme adaptively sets the level of the MCS according to the channel status between the mobile station and the base station, which are currently being connected, to improve whole system efficiency.

In order to increase a data transfer rate, in a portable Internet, a band AMC for relatively distinguishing between a good channel and a bad channel and allocating subchannels in a range allowed by a resource to mobile stations in consideration of the statuses of the subchannels is used. If the band AMC is applied, a mobile station to which a resource including good channels is allocated can perform high-speed data transmission, by modulating a signal to have a high capacity.

In the band AMC, an access terminal (AT) which is the mobile station measures channel quality information (CQI), collects channel information of subchannels which is being used, and uses a band including good subchannels on the basis of the channel information. Thus, influence due to peripheral noise and interference is reduced and thus the mobile station using the band AMC can increase a coding rate and transmit a signal at a relatively high transfer rate.

In the embodiments of the present invention, in order to support coexistence of primary wireless communication system such as WiMAX and secondary wireless communication system such as WiFi and Bluetooth, the band AMC is used.

A mobile station requests a base station to use adjacent subcarrier permutation upon uplink allocation. In addition, the mobile station may request the base station to use adjacent subcarrier permutation even upon downlink allocation, and, at this time, the same procedure as upon the uplink allocation may be performed. Although, hereinafter, only the uplink allocation is described, the technical range of the present invention is not limited to this.

As a method for making a request for adjacent subcarrier permutation, various methods may be used.

First, if an inactive period is implemented as a sleep period, a mobile station may transmit a sleep mode request (MOB_SLP-REQ) message to a base station and inform the base station that the mobile station enters the sleep mode for coexistence. The sleep mode request (MOB_SLP-REQ) message includes coexistence information. The coexistence information indicates that the mobile station makes a request for adjacent subcarrier permutation, for coexistence. A message to which the coexistence information is applied may be a sleep mode request (MOB_SLP-REQ) message, a sleep mode response (MOB_SLP-RSP) message or the like, if the inactive period is implemented as the sleep period. If the inactive period is implemented by another scheme or the inactive period is not presented, the coexistence information may be applied to any messages.

The base station which receives the coexistence information informs the mobile station that bits are set in a sleep mode response (MOB_SLP-RSP) message and subcarriers separated as far as possible from WLAN and WPAN having a 2.4-GHz ISM band are applied to uplink allocation upon scheduling.

Table 1 shows an example of the coexistence information (e.g. a coexistence bit) included in the sleep mode messages (e.g. MOB_SLP-REQ or MOB_SLP-RSP).

TABLE 1

| Type | Length | Value | Scope |
|------|--------|-------|-------|
| TBD  | 1      | Bit #0: co-located coexistence mode 1<br>Bit #1: co-located coexistence mode 2<br>Bit #2: sleep mode follows the MAP relevance for co-located coexistence.<br>Bit #3: Uplink band AMC for co-located coexistence.<br>Bit #4: Indicate band AMC subchannel allocation.<br>0b0: Subchannel shall be to the lowermost frequencies.<br>0b1: Subchannel shall be to the uppermost frequencies.<br>Bits #5~#7: reserved | MOB_SLP-REQ, MOB_SLP-RSP |

Referring to the table 1, the bit #0 and the bit #1 of coexistence information represent a co-located coexistence mode type, the bit #2 indicates the sleep mode follows the MAP relevance for co-located coexistence, and the bit #3 indicates uplink band AMC mode for co-located coexistence. Also, if bit #4 of coexistence information is set to 0, the subchannel is allocated to lowermost frequencies, or the bit #4 is set to 1, the subchannel is allocated to uppermost frequencies.

As another method for making a request for adjacent subcarrier permutation, one bit may be added to a report response (REP-RSP) message and be informed to the base station. That is, if wireless communication such as Bluetooth is turned on and a coexistence resource is necessary, the mobile station transmits a report response (REP-RSP) message in an unsolicited state.

At this time, in a parameter included in the report response (REP-RSP) message, co-located WPAN/WLAN coexistence is represented in a coexistence bit (bit #4) or any reserved bit excluding a basic report portion. The base station which receives the report response (REP-RSP) message confirms that the allocation of specific subcarriers is requested for the coexistence operation of the mobile station and performs scheduling on the basis of the confirmed result.

Table 2 shows an example of the coexistence bit (e.g. bit #4) included in the report response (REP-RSP) message.

TABLE 2

| REP-REQ Report type | Name | Type | Length | Value |
|---|---|---|---|---|
| Bit #0 = 1 | Basic report | 1.4 | 1 | Bit #0; WirelessHUMAN detected on the channel.<br>Bit #1; Unknown transmissions detected on the channel.<br>Bit #2; Specific spectrum user detected on the channel.<br>Bit #3; Unmeasured. Channel not measured.<br>Bit #4; Co-located WPAN/WLAN coexistence.<br>Bits #5-7; reserved |

If the mobile station exits from the sleep mode after turning off the wireless communication system such as WLAN, WPAN or the like, or if the mobile station makes a request for the movement from an AMC zone to a partial usage subchannel (PUSC) zone, the base station returns to previous distributed subcarrier permutation.

Figure 2:
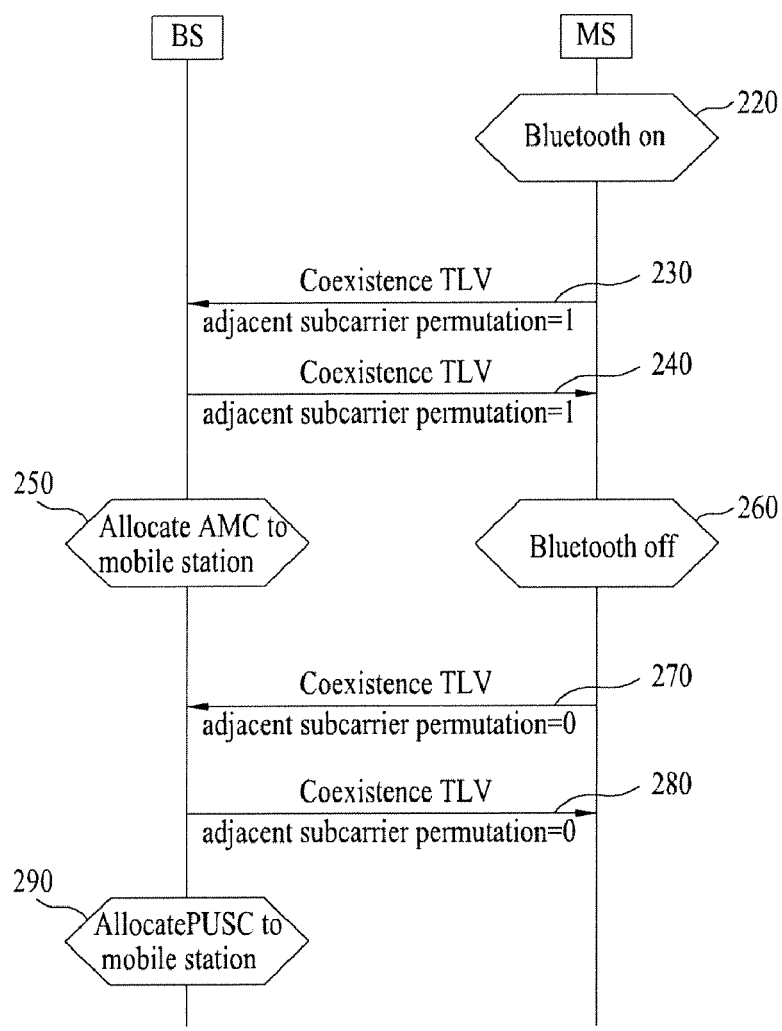
FIG. 2 is a signal flow diagram showing a method for supporting existence while considering subchannel allocation according to an embodiment of the present invention.

FIG. 2 is a signal flow diagram showing a method for supporting existence while considering subchannel allocation according to an embodiment of the present invention.

When a mobile station uses the coexisting wireless communication by turning on Bluetooth (220), the mobile station transmits coexistence information (e.g. coexistence TLV) to a base station via a medium access control (MAC) message and makes a request for adjacent subcarrier permutation (e.g. adjacent subcarrier permutation=1) (230). Even when the other wireless communication system excluding Bluetooth is used as the secondary wireless communication system, the following process is equally performed.

The base station which receives the coexistence information transmits a response (e.g. coexistence TLV) to the coexistence information to the mobile station (240).

In addition, the base station uses the AMC when performing uplink and/or downlink allocation to the mobile station (250).

When the mobile station does not use the coexisting wireless communication by turning off Bluetooth (260), the mobile station transmits the coexistence information (e.g. coexistence TLV) to the base station via the MAC message and makes a request for the release of the adjacent subcarrier permutation (270).

When the base station confirms that the coexistence resource is not necessary from the coexistence information, the base station transmits a response (e.g. coexistence TLV) to the coexistence information to the mobile station (280), and a previous permutation scheme is returned (290). In FIG. 2, since the previous permutation scheme is the PUSC, the PUSC is allocated to the mobile station.

The mobile station may perform the following procedure in order to perform handover while the coexisting wireless communication is used.

First, if the inactive period is implemented using the sleep mode, the release of the sleep mode is requested and the use of the coexisting wireless communication is stopped. For example, a coexisting wireless communication chip is informed of the stop of the use of the wireless communication via firmware in software or a coexisting wireless communication chip is informed of the stop of the use of the wireless communication via a wire in hardware.

If the sleep mode is not used, the use of the coexisting wireless communication in the mobile station may be simply stopped. Similarly, this process may be performed via firmware in software or in hardware. After handover, the mobile station transmits the coexistence information or the report response (REP-RSP) message to a new base station and makes a request for the support of coexistence.

Figure 3:
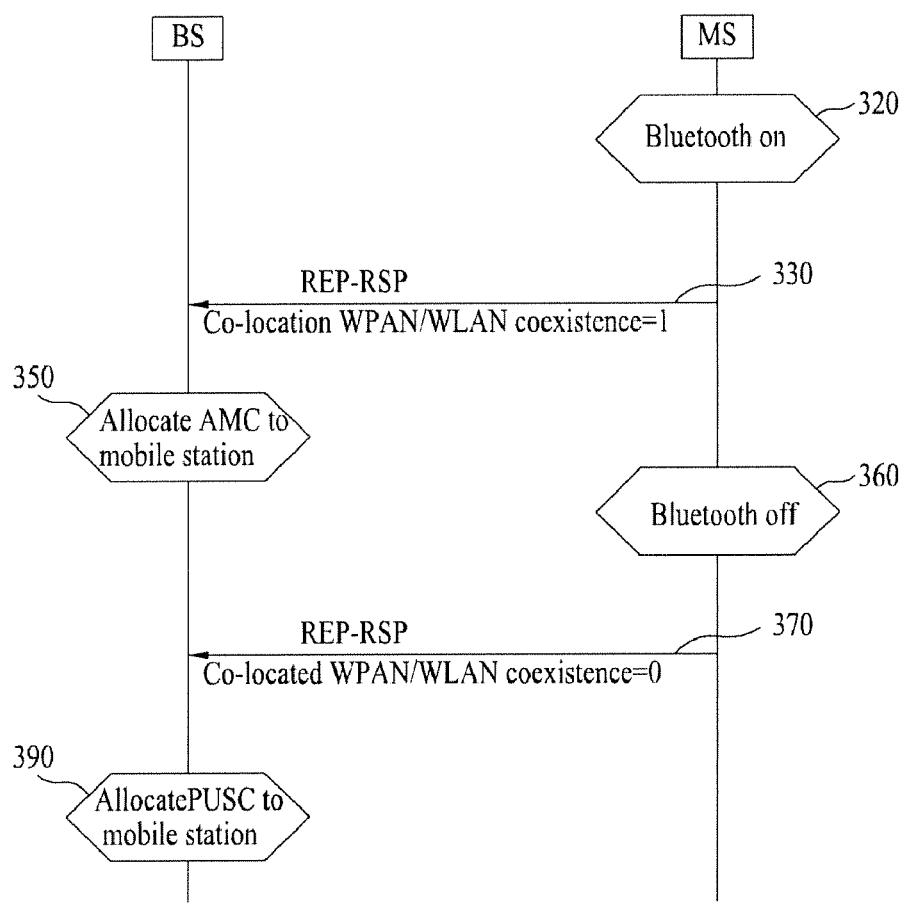
FIG. 3 is a signal flow diagram showing a method for supporting existence while considering subchannel allocation according to another embodiment of the present invention.

FIG. 3 is a signal flow diagram showing a method for supporting existence while considering subchannel allocation according to another embodiment of the present invention.

When a mobile station uses coexisting wireless communication by turning on Bluetooth (320), the mobile station makes a request for the support of coexistence to a base station via a report response (REP-RSP) message comprising coexistence information (330). The coexistence information is included in the report response (REP-RSP) message in the form of a co-located WPAN/WLAN coexistence field. In FIG. 3, if the co-located WPAN/WLAN coexistence field is set to 1, it is indicated that the adjacent subcarrier permutation is requested and, if the co-located WPAN/WLAN coexistence field is set to 0, it is indicated that the request for the adjacent subcarrier permutation is released. Even when the other wireless communication system excluding Bluetooth is used as the secondary wireless communication system, the following process is equally performed.

The base station which receives the report response (REP-RSP) message uses the AMC when performing uplink and/or downlink allocation to the mobile station (350).

When the mobile station does not use the coexisting wireless communication by turning off Bluetooth (360), the mobile station transmits the coexistence information (e.g. co-located WPAN/WLAN coexistence field set to 0) to the base station via the report response (REP-RSP) message and makes a request for the release of the adjacent subcarrier permutation (370).

When the base station confirms that the coexistence resource is not necessary from the coexistence information, a previous permutation scheme is returned (390). In FIG. 3, since the previous permutation scheme is the PUSC, the PUSC is allocated to the mobile station.

Figure 4:
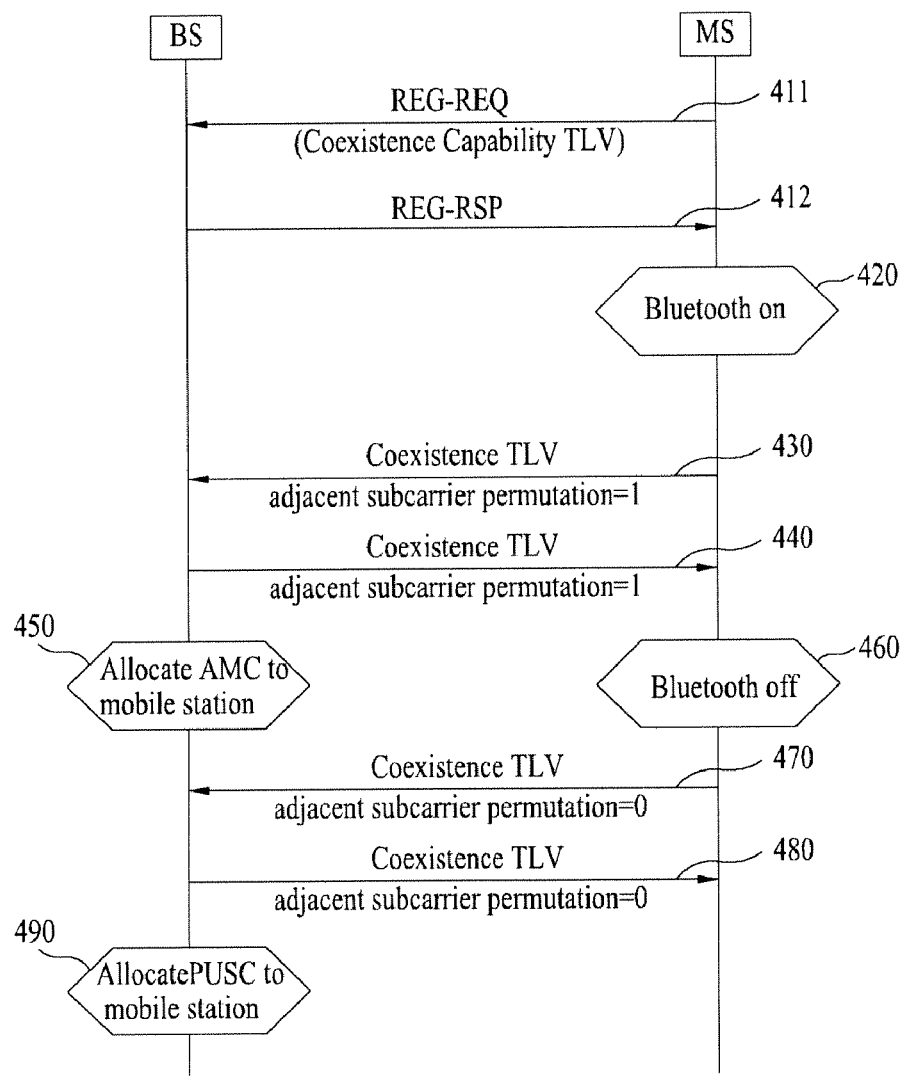
FIG. 4 is a signal flow diagram showing a method for supporting existence while considering subchannel allocation according to another embodiment of the present invention.

FIG. 4 is a signal flow diagram showing a method for supporting existence while considering subchannel allocation according to another embodiment of the present invention.

A mobile station may inform a base station of capability for supporting co-located coexistence for allowing different wireless communications to be used in the same time zone. New information having a type length value (TLV) form, that is, coexistence capability information, is used. In addition, the base station may transmit the coexistence capability information to the mobile station and inform the mobile station that the co-located coexistence can be supported. As an example of a message for transmitting the coexistence capability information (e.g. coexistence capability TLV), a registration request (REG-REQ) message and a registration response (REG-RSP) message may be used.

Table 3 shows an example of the coexistence capability information.

TABLE 3

| Type | Length | Value | Scope |
|---|---|---|---|
| [TBD] | 1 | Bit #0: PSC-based co-located coexistence mode 1<br>Bit #1: PSC-based co-located coexistence mode 2<br>Bit #2: Sleep mode follows the MAP relevance for PSC-based co-located coexistence | REG-REQ, REG-RSP |

TABLE 3-continued

| Type | Length | Value | Scope |
|------|--------|-------|-------|
|      |        | Bit #3; Uplink Band AMC for PSC-based co-located coexistence. Bits # 4-7: reserved | |

Referring to table 3, the bit #0 and the bit #1 of coexistence capability information represents a PSC-based co-located coexistence mode, the bit #2 indicates the sleep mode followed the MAP relevance for PSC-based co-located coexistence. Also, the bit #3 of coexistence capability information indicates uplink band AMC mode for PSC-based co-located coexistence.

In FIG. 4, the mobile station includes the coexistence capability information in a registration request (REG-REQ) message and transmits the REG-REQ message to the base station informing that the mobile station can support the co-located coexistence in a registration process (411).

The base station informs the mobile station that the co-located coexistence can be supported via the registration response (REG-RSP) message which includes the coexistence capability information (412).

When the mobile station uses coexisting wireless communication by turning on Bluetooth (420), the mobile station transmits coexistence information comprising a coexistence TLV to the base station via an MAC message and makes a request for adjacent subcarrier permutation (430).

The base station which receives the coexistence information transmits a response MAC message comprising the coexistence TLV in response to the MAC message to the mobile station (440). In addition, the base station uses the AMC when performing uplink and/or downlink allocation to the mobile station (450).

When the mobile station does not use the coexisting wireless communication by turning off Bluetooth (460), the mobile station transmits the coexistence information to the base station via the MAC message and makes a request for the release of the adjacent subcarrier permutation (470).

When the base station confirms that the coexistence resource is not necessary from the coexistence information, the base station transmits a response to the coexistence information to the mobile station (480), and a previous permutation scheme is returned (490).

Figure 5:
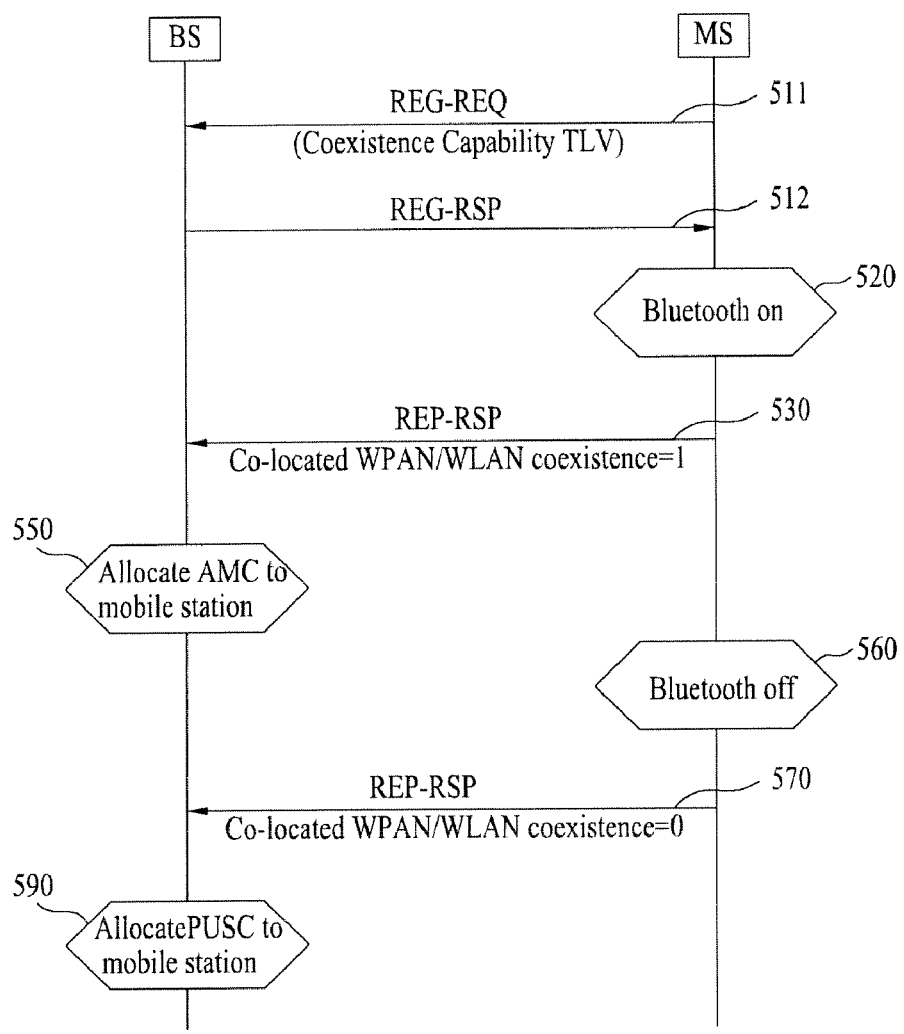
FIG. 5 is a signal flow diagram showing a method for supporting existence while considering subchannel allocation according to another embodiment of the present invention.

FIG. 5 is a signal flow diagram showing a method for supporting existence while considering subchannel allocation according to another embodiment of the present invention.

In FIG. 5, a mobile station includes coexistence capability information (e.g. coexistence capability TLV) in a registration request (REG-REQ) message and informs the base station that the mobile station can support the co-located coexistence in a registration process (511).

The base station transmits a registration response (REG-RSP) message comprising coexistence capability information which indicates the co-located coexistence can be supported to the mobile station (512).

When the mobile station uses coexisting wireless communication by turning on Bluetooth (520), the mobile station makes a request for the support of coexistence to the base station via the report response (REP-RSP) message (530).

The base station which receives the report response (REP-RSP) message uses the AMC when performing uplink and/or downlink allocation to the mobile station (550).

When the mobile station does not use the coexisting wireless communication by turning off Bluetooth (560), the mobile station transmits the coexistence information to the base station via the report response (REP-RSP) message and makes a request for the release of the adjacent subcarrier permutation (570).

When the base station confirms that the coexistence resource is not necessary from the report response (REP-RSP) message, a previous permutation scheme is returned (590).

Although the method for, at the mobile station, making a request for the support of the coexistence to the base station using a new bit of a band AMC message and new information of the TLV form is described, the same coexistence support method, that is, the coexistence support using the band AMC, may be requested by other information exchange methods.

According to the embodiments of the present invention, it is possible to simultaneously use WWAN communication and WPAN/WLAN communication and, as a result, improve coexistence throughput, by adjusting subcarrier permutation upon uplink and/or downlink transmission in a broadband wireless system such as IEEE 802.16e.

According to the present invention, it is possible to simultaneously use WWAN communication such as IEEE 802.16e and WPAN/WLAN communication such as Bluetooth or WiFi and improve coexistence throughput. The present invention is applicable to an apparatus such as a base station, a mobile station or the like in a broadband wireless system.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method for supporting coexistence in a mobile station configured for supporting a coexistence mode of a primary wireless communication system and a secondary wireless communication system, the method performed by the mobile station and comprising:

transmitting a sleep mode request (MOB_SLP-REQ) message to a base station, the MOB_SLP-REQ message requesting an initiation of a sleep mode and comprising first coexistence information for requesting an allocation of a band adaptive modulation and coding (AMC) for adjacent subcarrier permutation during the sleep mode; and receiving a sleep mode response (MOB_SLP-RSP) message from the base station in response to the MOB_SLP-REQ message, the MOB_SLP-RSP message comprising second coexistence information for allocating band AMC subchannels to the mobile station, wherein the band AMC subchannels of an uppermost frequency band are allocated to the mobile station during the sleep mode of the primary wireless communication system supporting the coexistence mode.

2. The method of claim 1, wherein subchannels of the uppermost frequency band or a lowermost frequency band are allocated to the mobile station for the adjacent subcarrier permutation based on a bit value of the first coexistence information.

3. The method of claim 1, further comprising requesting release of the adjacent subcarrier permutation by transmitting a MOB_SLP-REQ message comprising third coexistence information for requesting partial usage subchannel (PUSC) allocation to the mobile station.

4. The method of claim 3, wherein the primary wireless communication system is a WiMAX system and the transmission of the second MOB_SLP-REQ message comprising the third coexistence information is performed in a WiMAX active period.

5. The method of claim 1, further comprising:

transmitting a registration request (REG-REQ) message to the base station before transmitting the MOB_SLP-REQ message, the REG-REQ message comprising first coexistence capability information which indicates that the mobile station can support the coexistence mode; and receiving a registration response (REG-RSP) message in response to the REG-REQ message, the REG-RSP message comprising second coexistence capability information which indicates that the base station can support the coexistence mode.

6. A method for supporting a coexistence operation of a mobile station configured for supporting a coexistence mode of a primary wireless communication system and a secondary wireless communication system, the method performed by a base station and comprising:

receiving a sleep mode request (MOB_SLP-REQ) message from the mobile station, the MOB_SLP-REQ message requesting an initiation of a sleep mode and comprising first coexistence information for requesting an allocation of a band adaptive modulation and coding (AMC) for adjacent subcarrier permutation during the sleep mode;

transmitting a sleep mode response (MOB_SLP-RSP) message in response to the MOB_SLP-REQ message to the mobile station, the MOB_SLP-RSP message comprising second coexistence information for allocating band AMC subchannels to the mobile station; and allocating the band AMC subchannels to the mobile station, wherein the band AMC subchannels of an uppermost frequency band are allocated to the mobile station during the sleep mode of the primary wireless communication system supporting the coexistence mode.

7. The method of claim 6, wherein allocating the subchannel comprises allocating subcarriers of the uppermost frequency band or a lowermost frequency band to the mobile station based on a bit value of the first coexistence information.

8. The method of claim 6, further comprising: receiving a MOB_SLP-REQ message comprising third coexistence information for requesting partial usage subcarrier (PUSC) allocation; and releasing the adjacent subcarrier permutation.

9. The method of claim 8, wherein the primary wireless communication system is a WiMAX system and the reception of the second MOB_SLP-REQ message comprising the third coexistence information is performed in a WiMAX active period.

10. The method of claim 6, further comprising:

receiving a registration request (REG-REQ) message from the mobile station before receiving the MOB_SLP-REQ message, the REG-REQ message comprising first coexistence capability information which indicates that the mobile station can support the coexistence mode; and transmitting a registration response (REG-RSP) message in response to the REG-REQ message, the REG-RSP message comprising second coexistence capability information which indicates that the base station can support the coexistence mode.

* * * * *